United States Patent [19]

Farrenkopf

[11] Patent Number: 5,144,183
[45] Date of Patent: Sep. 1, 1992

[54] FLAT MOTOR OF REDUCED LENGTH

[75] Inventor: Jeffrey J. Farrenkopf, Smithtown, N.Y.

[73] Assignee: Kollmorgen Corporation, Simsbury, Conn.

[21] Appl. No.: 615,983

[22] Filed: Nov. 20, 1990

[51] Int. Cl.$^5$ .............................................. H02K 1/22
[52] U.S. Cl. ...................................... 310/268; 310/71; 310/89; 310/208; 310/237; 310/248; 310/DIG. 6
[58] Field of Search ................. 310/268, 154, 90, 239, 310/DIG. 6, 233, 234, 237, 288, 71.89, 258, 208, 211, 212

[56] References Cited

U.S. PATENT DOCUMENTS

| | | | |
|---|---|---|---|
| 3,488,539 | 1/1970 | Tucker | 310/268 |
| 3,544,822 | 12/1970 | Pickles | 310/268 A X |
| 3,558,947 | 1/1971 | Burr | 310/268 |
| 3,566,165 | 2/1971 | Lohr | 310/268 |
| 3,719,845 | 3/1973 | Takeda | 310/268 |
| 4,068,143 | 1/1978 | Whitely | 310/268 |
| 4,082,971 | 4/1978 | Miyake et al. | 310/268 X |
| 4,360,751 | 11/1982 | Arnold, Jr. et al. | |
| 4,536,672 | 8/1985 | Kanayama et al. | 310/268 |
| 4,633,112 | 12/1986 | Miyake | 310/90 |
| 4,763,037 | 8/1988 | Hashimoto | 310/268 |
| 4,829,208 | 5/1989 | Uchino | 310/268 |
| 4,949,002 | 8/1990 | Ibe | 310/268 |

FOREIGN PATENT DOCUMENTS

| | | |
|---|---|---|
| 670734 | 9/1963 | Canada . |
| 1146576 | 4/1963 | Fed. Rep. of Germany . |
| 2143752 | 3/1973 | Fed. Rep. of Germany . |
| 376558 | 4/1963 | Switzerland . |
| 962256 | 7/1964 | United Kingdom . |
| 1166597 | 10/1969 | United Kingdom . |
| 1169935 | 11/1969 | United Kingdom . |
| 1407431 | 9/1975 | United Kingdom . |
| 2127231 | 4/1984 | United Kingdom . |

Primary Examiner—R. Skudy
Attorney, Agent, or Firm—Morgan & Finnegan

[57] ABSTRACT

There is disclosed a flat motor of reduced length and maximized power output and which is suitable to being disposed in a limited space configuration and a close tolerance within other objects which may be present in such limited space.

15 Claims, 4 Drawing Sheets

FLAT MOTOR OF REDUCED LENGTH

This invention relates to motors. More particularly, it relates to a flat motor of reduced length and maximized power output.

BACKGROUND OF THE INVENTION

Flat or "pancake" motors have been employed in numerous applications where length is a critical factor. In general, axial air gap "pancake" armature designs provide the shortest length motor profiles available and are characterized by axial air gap, printed, stamped or wire wound armatures and axial or radial oriented brush/spring assemblies for axial or radial commutation.

While known motors of this type have proved themselves beneficial for their desired purposes, today there are many applications where reduction of length need be optimized even further. For example, this is the case with motors used in many automotive applications, such as in radiator and condenser cooling modules, as well as window lifts, blower assemblies and the like. Engine compartments and body panels in automobiles are constantly decreasing in available volume while passenger space is constant or increasing. Consequently, minimizing length and weight, as well as costs, while maximizing power output are important criteria for not only automotive applications but also other applications of such motors, as, for example, aerospace, industrial and other commercial applications. It is to be understood, therefore, while the flat motor of reduced length of this invention is disclosed in its relation to automotive applications, it may also be employed in a wide variety of aerospace, industrial and commercial applications.

Accordingly, it is the purpose of this invention to provide a motor having reduced length and weight, as well as minimized costs of manufacturing, while increasing efficiency and output power. In the past, in order to reduce motor length, alternatives such as double cage magnet structures, that is, two individual magnet lengths, bearing journals located within the stamping, and radially oriented brush holder assemblies located between magnet poles on wire wound armature designs with standard commutation and rear radial exit leads, have been employed. There exists, however, a need to provide a motor embodying these features and others in an even more optimized manner. The present invention fulfills such needs.

BRIEF STATEMENT OF THE INVENTION

In accordance with the invention, there is provided a flat D.C. printed circuit or stamped armature electric motor having a reduced length from front to rear comprising, in combination, a housing having front and rear housing assemblies; a shaft disposed in the housing on the central axis of the motor and at least part of which protrudes through the front housing assembly of the housing; a stator assembly located in the housing; an armature assembly having planar windings either printed or stamped, located in the housing; mounting means for mounting the assemblies for rotating one in a planar path past the other located in the housing; the stator assembly including a magnetic circuit assembly directing a magnetic field to the planar windings of the armature in a direction normal to the plane of the armature; commutation means located in the housing in the vicinity of the armature assembly for electrically energizing the planar windings of the armature to impart a rotary motion to one of the assemblies and rotate it past the other; and wire means connected to the stator assembly which exit the housing at a point radially distant from the central axis of the motor and which pass through the interior of the housing between the front housing assembly thereof and the rear housing assembly.

In a modification of the motor, the commutation means is located on the same side of the housing as that portion of the shaft which protrudes through the front housing assembly.

THE DRAWINGS

The aforementioned aspects of this invention and other features thereof are set forth in the following description of the invention which is to be taken in conjunction with the accompanying Drawings in which.

DESCRIPTION OF THE PREFERRED EMBODIMENTS

Figure 1:
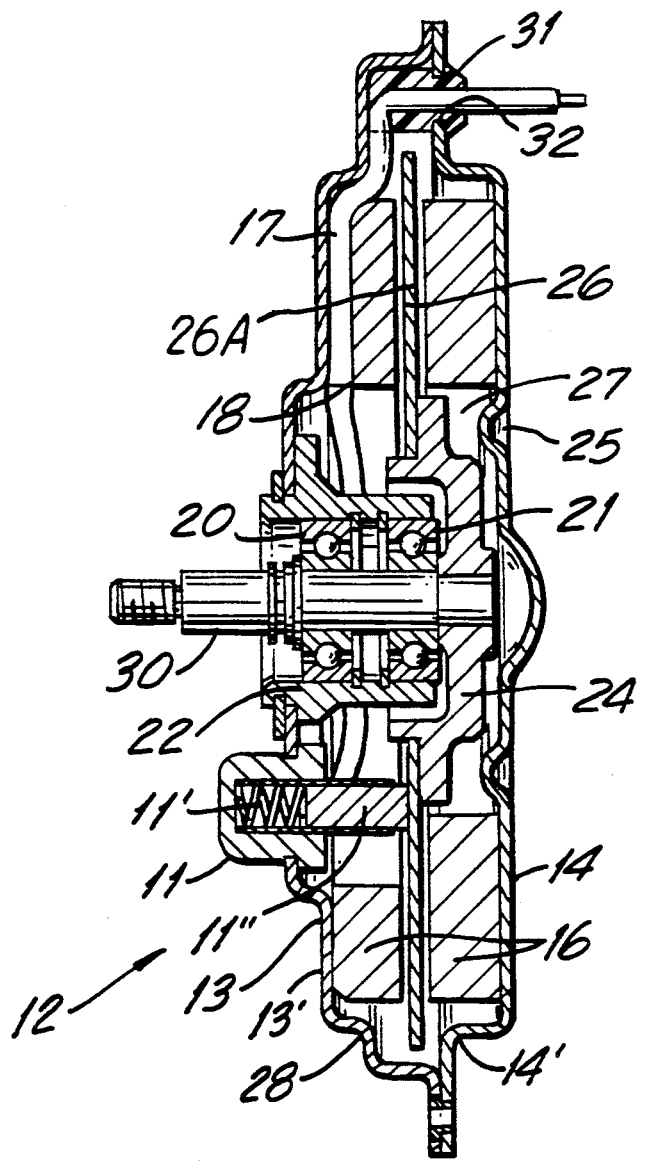
FIG. 1 is a lateral, sectional view of a motor according to the invention taken along the central axis thereof showing the bearings journalled off the front housing assembly.

Referring now more particularly to FIG. 1, a motor 12 in accordance with the invention comprises brush holder assembly 11, including a spring 11' and brush 11", located on the output shaft side of the motor housing which is comprised of a front housing assembly 13 and a rear housing assembly 14 provided with endcaps elements 13' and 14', respectively. At least one other brush holder assembly is present, but not visible in FIG. 1, for the motor to operate. In the motor shown in FIG. 1, a stator assembly is located in the motor housing being supported thereby and comprising a double cage magnet structure 16, although it is to be understood that a single cage structure can be employed in the practice of this invention in which case one magnet of the double cage magnet structure 16 is omitted.

Motor leads 17 can be passed under or through a magnet or between a magnet and the housing and then exit axially or radially from the housing through the rear (as shown in FIG. 1) or front (not shown) of the motor. In the embodiment shown in FIG. 1, leads 17 are disposed in a groove 18 of the a magnet of magnet structure 16 and exit axially through the rear housing assembly 14.

A flat armature assembly including a commutator 26A comprising planar windings 26 is also located in the housing and supported on armature hub 24.

Figure 2:
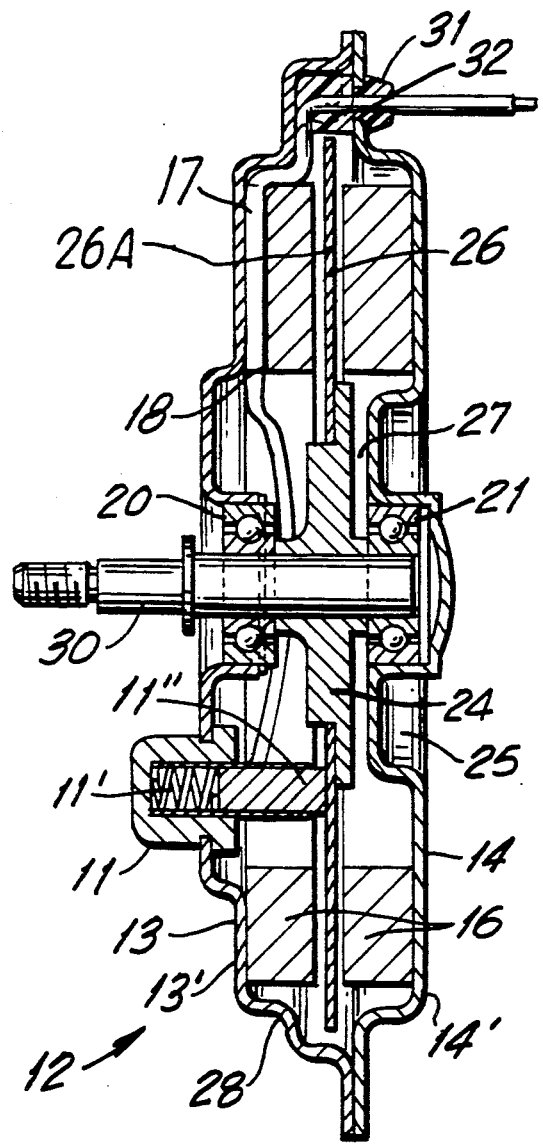
FIG. 2 is a modification of the motor illustrated in FIG. 1 showing the bearings journalled within the front and rear endcaps of the motor.

Bearings 20 and 21 are recessed within the motor housing assemblies 13 and 14 by bearing journals within the endcaps 13' and 14' of housing assemblies 13 and 14, respectively, or within a separate spindle assembly 22 or combination thereof. It is also to be understood that it is within the purview of this invention to journal the bearings all off the front housing assembly 13, as illustrated in FIG. 1, the rear housing assembly 14, or to split them up between the front and rear endcaps 13' and 14' of the motor as shown in FIG. 2. Still further, the bearings 20 and 21 are tucked within the armature hub 24 and within the magnet inner diameters.

Strengthening of the rear housing portion 14, if desired or required, is accomplished by forming a rib or depression 25 which falls into the magnet inner diameter 27, thus eliminating the need for any protruding ribs or other metal forming. Another formed depression 28 located on the front housing assembly 13 allows external load features to be located closer to the front of the motor, thus shortening the package even further, as well as allowing for reduction of the overall length of shaft 30.

In accordance with this invention, it is preferred that a grommet 31 or bushing be provided on the motor housing to insure that wire leads 17 are not pulled loose from their connection in the interior of the housing, the grommet being located as an opening 32 in the rear housing assembly 14 at a point radially distant from the central axis of the motor.

Figure 4:
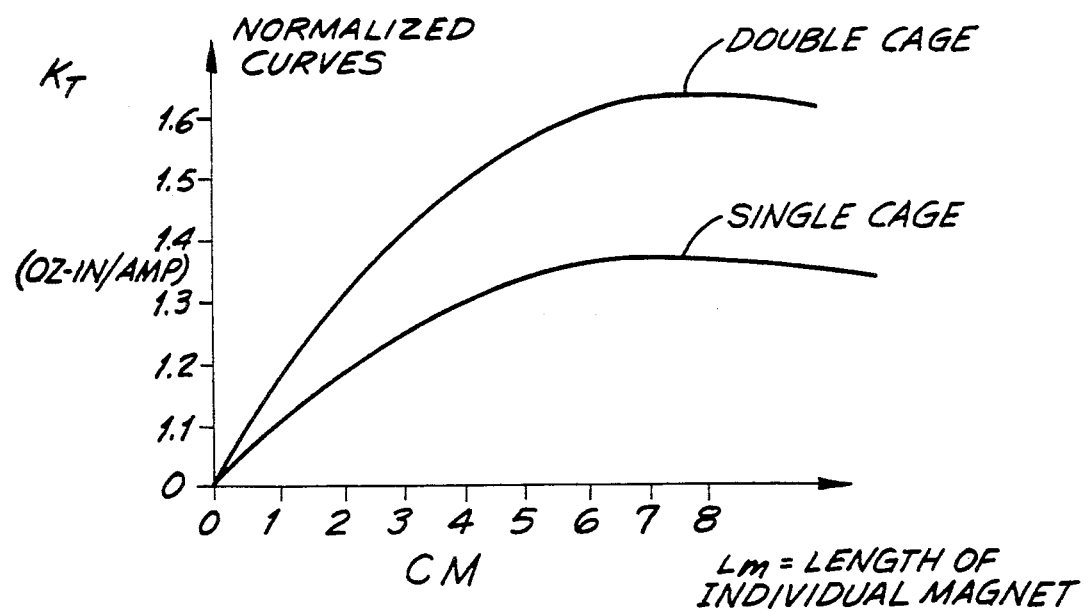
FIG. 4 is a graph showing the relationship of the motor torque constant (kt) and magnet length in D.C. motors such as that of the present invention.

In the design of D.C. motors, one key factor is the motor torque constant (kt) which has units of torque per ampere, expressed as ounce-inch per ampere. It is desirable to increase the kt in order to reduce current draw for a given torque. The kt is proportional to the magnetic flux density which, in turn, is proportional to the magnet length, expressed in centimeters (cm) for the sake of convenience for a small motor. This relationship is modified by the introduction of magnetic-flux leakage. As the magnet length increases, the gain in performance rolls off, and can even decrease if the magnet length is too long. This occurs because the flux leakage increases as the magnet length increases. In FIG. 4, the graph demonstrates the kt of a motor of this invention and which also shows the change in performance as the magnet length changes for both single and double cage magnet structures.

As can be seen from reference to the graph, when the curve begins to become asymptotic for the single cage structure, the double cage structure for the same individual magnet length shows improved performance in kt. This happens because the flux leakage for double cage structures is less than for single cage structures when comparing equivalent total magnet lengths. Consequently, higher power can be achieved and it is more magnetically efficient to use two individual magnets (double cage) across an air gap rather than a single magnet of equal length for the same gap. Thus, while it is within the purview of this invention to employ a single case structure, a double cage structure is preferred.

An additional advantage of a double cage structure is that it permits interior motor components, such as the bearing and armature hubs, to be packaged within the inner diameter space of the magnet, thus allowing the effective overall package length to be reduced even further.

Figure 3:
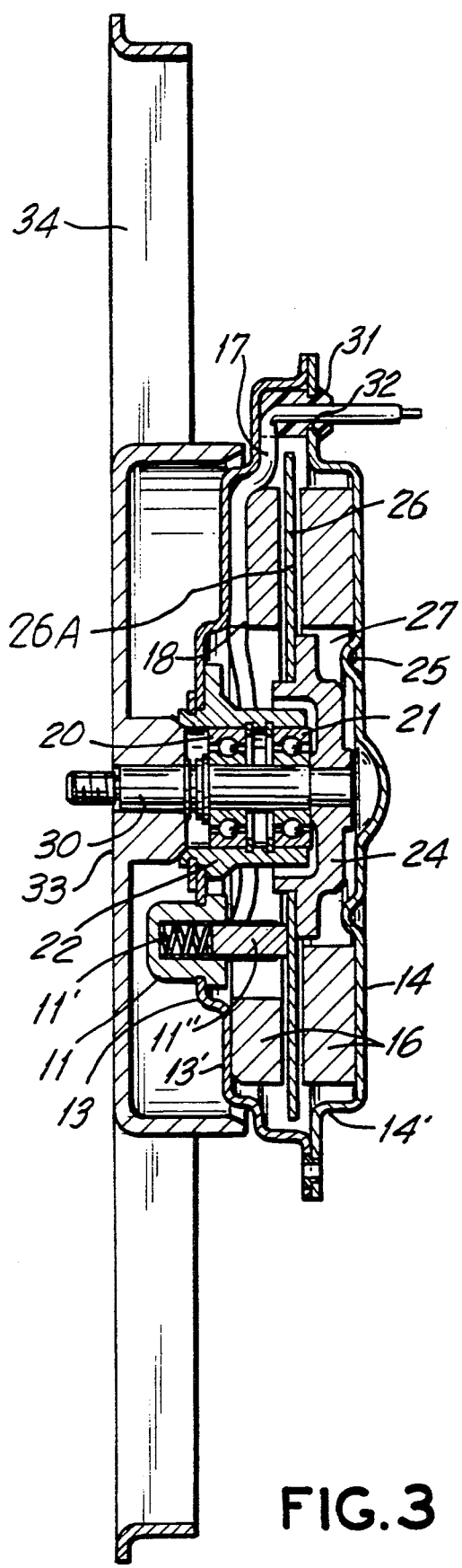
FIG. 3 is an illustration of a lateral, sectional view of the motor shown in FIG. 1 mounted to and within the hub portion of a fan.

An additional advantage is obtained by positioning the brush assemblies on the output shaft side of a motor in accordance with this invention, since this reduces effective motor length by eliminating rear protrusions located radially beyond the motor center line. The shift of the brush length protrusion to the front side of the housing in many applications does not affect the units effective length because, in such applications, the brushes can be tucked inside the component that is mounted on the shaft. An excellent example of this advantage is illustrated in FIG. 3 where the motor of this invention is mounted within the hub portion 33 of a fan 34.

While it is preferred to provide a groove, as mentioned above, either within or under the magnet in which the motor leads 17 are disposed, it is within the purview of the invention that the leads 17 can also be passed between adjacent magnet poles, for example, in a double cage structure. The leads are then passed outside the motor radially distant from the outside or beyond of an outer diameter of the armature assembly through the motor case or axially through the rear motor case. While either construction may be utilized to pass the leads 17 to the exterior of the motor case or housing, radial disposition, as described above, is preferred, axial disposition being more difficult because leads must pass across the rotating armature, thus requiring other provisions in the motor housing, such as a formed depression or a machined channel (not shown). This will require strain relieving of some type, either mechanical or adhesive in order to insure that the leads are not displaced from their connection.

It is also within the purview of this invention to employ a wide variety of known brush and spring urged assemblies in a motor of this invention, such as constant force brush and spring urged assemblies provided with constant force springs, or brush and spring urged assemblies utilizing helical, torsional or flat springs. In addition, single cage magnet structures offer shorter packaging. On the other hand, for the reasons mentioned above, the same given magnetic material will provide a reduced power output. Consequently, although single caged magnetic structures may be employed in the motor of this invention, the double cage magnet structures are preferred.

In addition to the advantages mentioned above, the motor of this invention is further advantageous in that it provides a small package which permits efficient use of space. The motor is relatively light in weight and has a low current draw and is further advantageous in that it can be employed with other elements, such as a fan to provide a small but useful package which can be utilized in limited spatial areas. Numerous other advantages of the motor of this invention will be readily apparent to those skilled in the art. For example, the motor may be of materials which are utilized in presently known motors, yet these materials may be shaped and formed so that they provide a small, neat, compact package which permits construction of an efficient motor without substantially reducing the power output thereof. Moreover, the motor may be constructed from components and materials which are readily available through commercial channels. In addition, it is to be noted that the disposition of the brushes on the output side of the motor and near the protruding portion of the shaft is advantageous since the protruding portion of the shaft being longer than the height of the brushes, prevents damage to the brushes if the motor is accidentally dropped.

It is to be understood that this invention is not to be limited to the specific embodiments described hereinabove and that numerous variations of these embodiments may be made without departing from the spirit and scope of this invention. Accordingly, the invention is to be limited to the described embodiments, except as defined in the appended claims.

What is claimed is:

1. A flat D.C. electric motor having a reduced length from front to rear comprising in combination:
   a stationary housing have front and rear housing assemblies and including end caps;
   a rotating shaft disposed in said stationary housing on a central axis of said motor and at least part of which shaft protrudes through the front housing assembly of said stationary housing;
   a stator assembly located in said stationary housing;
   an armature assembly having planar windings located in said stationary housing;
   means for mounting the stator and armature assemblies in said stationary housing and for rotating said armature assembly in a planar path past said stator assembly located in said stationary housing;
   said stator assembly including a magnetic circuit assembly directing a magnetic field to said planar windings of said armature assembly in a direction normal to a plane of said armature assembly;
   commutation means, including a brush assembly, located in said stationary housing in a vicinity of said armature assembly and on the same side thereof as that portion of said rotating shaft protrudes through said stationary housing for electrically energizing the planar windings of said armature assembly and imparting a rotary motion thereto past said stator assembly;
   and wire means connected to said brush assembly and exiting said stationary housing at a point radially distant from said central axis of said motor and outside an outer diameter of said armature assembly and which pass through an interior of said stationary housing between the front housing assembly and the rear housing assembly, whereby disposition of said commutation means including said brush assembly results in a motor of reduced length from front to rear and which is adaptable to being disposed in a limited space configuration.

2. A motor according to claim 1, wherein the magnetic circuit assembly is a double cage structure.

3. A motor according to claim 1, wherein the magnetic circuit assembly is a single cage structure.

4. A motor according to claim 1, wherein the magnetic circuit assembly is provided with a groove and the wire means connected to the brush assembly and exiting the stationary housing at a point radially distant from the central axis of the motor is located in said groove before passing to exteriorly of said stationary housing.

5. A motor according to claim 1, wherein the wire passes between the rear housing assembly and a magnet segment of the magnetic circuit assembly.

6. A motor according to claim 1, wherein the wire means exits the motor through the front housing assembly.

7. A motor according to claim 1, wherein the wire means exits the motor through the rear housing assembly.

8. A motor according to claim 1, wherein an opening having a grommet disposed therein is provided in the stationary housing at a point radially distant from the central axis of said motor and the wire means passes through said grommet to relieve any strain on said wire means.

9. A motor according to claim 1, wherein a depression is formed on the rear housing assembly of the stationary housing.

10. A motor according to claim 1, including the bearings recessed within the stationary housing in bearing journals located within the endcaps of said stationary housing.

11. A motor according to claim 1, including an armature hub located within the stationary housing on the central axis of said motor and around which the magnetic circuit assembly is disposed, including bearings located within said armature hub.

12. A motor according to claim 1, wherein the commutation means cooperate with said brush assembly.

13. A motor according to claim 1, wherein the armature assembly is a printed circuit.

14. A motor according to claim 1, wherein the armature assembly is a stamped circuit.

15. A flat D.C. electric motor having a reduced length from front to rear comprising in combination:
   a stationary housing having front and rear housing assemblies and including end caps;
   a rotating shaft disposed in said stationary housing on a central axis of said motor at least part of which shaft protrudes through the front housing assembly of said stationary housing;
   a stator assembly located in said stationary housing;
   an armature assembly having planar windings located in said stationary housing;
   means for mounting the stator and armature assemblies in said stationary housing and for rotating said armature assembly in a planar path past said stator assembly located in said stationary housing;
   said stator assembly including a magnetic circuit assembly directing a magnetic field to said planar windings of said armature assembly in a direction normal to a plane of said armature assembly;
   commutation means, including a brush assembly, located in said stationary housing in a vicinity of said armature assembly and on a same side thereof as that portion of said rotating shaft protrudes through said stationary housing for electrically energizing said planar windings of said armature assembly to impart a rotary motion thereto past said stator assembly;
   and wire means connected to said brush assembly and exiting said stationary housing at a point radially distant from said central axis of said motor and beyond an extent of said armature assembly and which pas through an interior of said stationary housing between the front housing assembly and the rear housing assembly, whereby disposition of said commutation means including said brush assembly of said motor on the same side of said stationary housing as the portion of said shaft protruding therefrom results in said motor of reduced length from front to rear and which is adaptable to being disposed in a limited space configuration.

* * * * *